Figure 1:
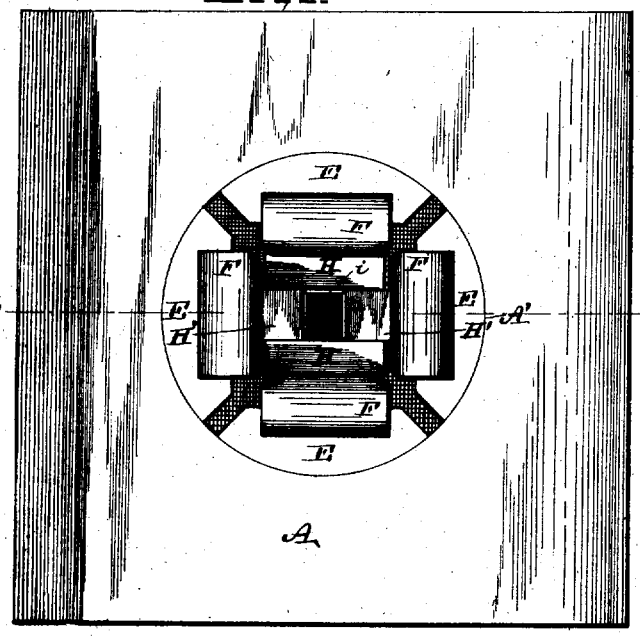

S. & W. MOLTRUP.

DIE AND DIE HOLDER FOR DRAWING STEEL RODS, &c.

No. 11,318. Reissued Mar. 28, 1893.

WITNESSES:

M. G. Doyle

M. E. Gillis.

INVENTORS:

Stephen Moltrup and

William Moltrup

BY

Higdon and Higdon

ATTORNEYS.

UNITED STATES PATENT OFFICE.

STEPHEN MOLTRUP AND WILLIAM MOLTRUP, OF BEAVER FALLS, PENNSYLVANIA.

DIE AND DIE-HOLDER FOR DRAWING STEEL RODS, &c.

SPECIFICATION forming part of Reissued Letters Patent No. 11,318, dated March 28, 1893.

Original No. 423,334, dated March 11, 1890. Application for reissue filed November 21, 1891. Serial No. 412,691.

*To all whom it may concern:*

Be it known that we, STEPHEN MOLTRUP and WILLIAM MOLTRUP, citizens of the United States, and residents of Beaver Falls, in the county of Beaver and State of Pennsylvania, have invented certain new and useful Improvements in Dies and Die-Holders for Drawing Steel Rods, &c.; and we do hereby declare that the following is a full, clear, and exact description of the invention, which will enable others skilled in the art to which it appertains to make and use the same.

The object of our invention consists in providing certain new and useful improvements in dies and die-holders for the drawing, compressing and polishing of metal bars or wire; and it consists more particularly in the means whereby adjustability and shape may be given to the die-blocks for the compression of the metal at various thicknesses.

With these objects in view our invention consists in the construction and arrangement of parts, as hereinafter more fully described.

Figure 4:
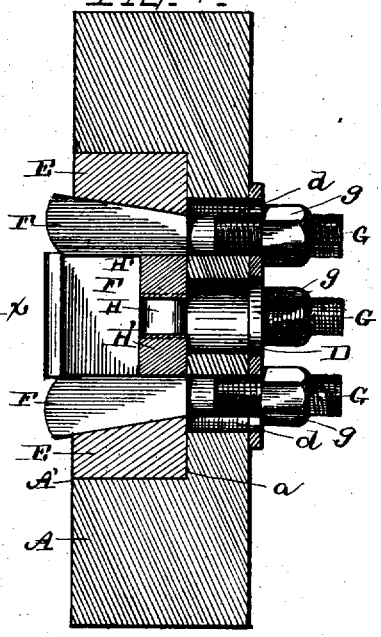
Figure 2:
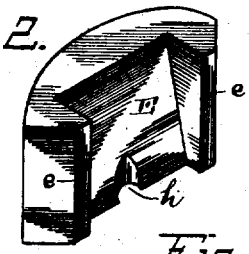
Figure 5:
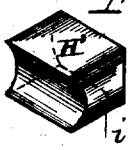
Figure 3:
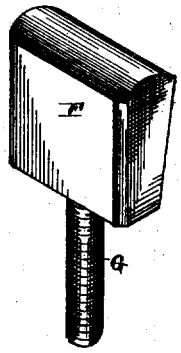
Figure 6:
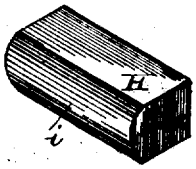

Referring to the drawings forming a part of this specification, Figure 1, is a plan view of our improved device complete; Fig. 2, a detail view showing one of the segmental guide blocks; Fig. 3, a detail view of one of the adjustable wedge-blocks; Fig. 4, a longitudinal section on line $x\,x$, Fig. 1; Fig. 5, a detail view of one of the side die-blocks, and Fig. 6, a similar view showing one of the end blocks.

Similar letters of reference are used to designate corresponding parts throughout the entire specification and several views of the drawings.

The letter A is used to indicate the draw-plate, said plate having a suitably-shaped recess A′ formed therein. The recess extends for about one-half the thickness of the draw-plate, and the bottom thereof is provided with the opening D and bolt-holes *d*, *d*. Within the circular recess is located the segmental guide blocks E, the outer faces of which are curved sufficiently to conform to the contour of the wall of the circular recess, against which they abut, and the inner faces thereof are inclined. These guide-blocks are further provided with beveled shoulders *e*, *e*. Located between the beveled shoulders of the guide-blocks are the adjustable wedge-blocks F, the outer faces of which are inclined to correspond with the incline of the guide-blocks. The lower ends of the adjustable wedge-blocks are provided with the screw-threaded bolts G, which bolts pass through the bolt-holes *d*, *d*, formed in the bottom of the circular recess, and have attached thereto the nuts *g*, by means of which the adjustable blocks are tightened or loosened upon the die-blocks. The lower ends of the inner faces of the segmental guide-blocks are provided with the groove *h*, which receives the bolt portion of the wedge when the same has been loosened.

The letters H, H, indicate the side die-blocks, said blocks being provided with the round or curved face *i*, and the end die-blocks are represented by the letters H′, H′. These end blocks have their inner faces rounded or curved and the sides thereof concaved in conformity with the curve of the face of the side blocks, so as to allow of the latter fitting snugly therein, thus forming a square adjustable die provided with rounded or curved inner faces. When in an adjusted position these die-blocks rest upon the inner faces of the blocks F, and as these blocks are made adjustable, it is obvious that the tighter they are screwed the greater will be the pressure of the die-blocks upon the passing metal. The faces of the die-blocks may be of any shape in which it is desired that the metal shall be compressed.

What we claim is—

1. A die comprising side blocks having curved or rounded inner faces and interposed die blocks, the abutting sides of which conform to the curved or rounded faces against which they bear, substantially as described.

2. A die comprising side and end die blocks having curved or rounded inner sides, the end blocks being interposed between the side blocks and the sides of the end blocks conforming to the faces of the side blocks, substantially as described.

3. The combination with a draw plate, of a die composed of side and end die blocks having curved or rounded inner faces the sides of the end blocks conforming to the faces of the side blocks, wedge blocks against which the outer sides of the side blocks bear and means for adjusting the wedge blocks, substantially as described.

4. In a die and die-holder for drawing, compressing, and polishing metal bars, the combination with the draw-plate, of die blocks consisting of rectangular shaped blocks having their inner faces curved or rounded and end blocks disposed between the ends of said side blocks so as to form a central opening, the ends thereof which bear against the side blocks being concaved, while their inner faces are convexed or rounded, and adjustable blocks against which the outer sides of the die blocks bear for regulating the pressure of the die upon the metal, substantially as set forth.

5. In combination with the herein-described die blocks, the apertured circular-recessed draw-plate, segmental guides fitting in said recess, and the adjustable wedge blocks, substantially as set forth.

6. In combination with the herein described die-blocks, the apertured circular recessed draw-plate, segmental guides, the outer faces of which are adapted to conform with the contour of the wall of the circular recess, and provided with inclined inner faces, adjustable wedge blocks, screw-threaded bolts attached to said adjustable blocks, and the nuts for tightening or loosening said blocks, substantially as and for the purpose set forth.

7. The combination with the herein-described die-blocks and draw-plate, of the inclined segmental guide blocks, shoulders formed upon said guides, adjustable wedge blocks having their outer faces inclined correspondingly with the incline of the segmental guides, and fitting between the shoulders of the guides, screw-bolts attached to the adjustable blocks, and the nuts for increasing or decreasing the pressure of said blocks upon the die-blocks, substantially as and for the purpose herein shown and described.

8. In the herein-described draw-plate, the combination with the die-blocks, of the segmental guide-blocks, beveled shoulders formed on said blocks, a groove or channel located at the bottom of the inner face of said blocks, an adjustable wedge fitting between the shoulders of the guide, screw-threaded bolts attached to said wedges, and the nuts for increasing or decreasing the pressure of the wedge-blocks upon the die for regulating the size of the opening for the metal, substantially as herein set forth.

In testimony whereof we have hereunto affixed our signatures in the presence of two witnesses.

STEPHEN MOLTRUP.
WILLIAM MOLTRUP.

Witnesses:
A. H. CROSSMAN,
JAMES F. MERRIMAN.